HYBRID DISTRIBUTED-LUMPED-CONSTANT DELAY LINE

Filed March 29, 1965

United States Patent Office
3,421,119
Patented Jan. 7, 1969

3,421,119

HYBRID DISTRIBUTED-LUMPED-CONSTANT DELAY LINE

Milton Zerkin, Fairlawn, N.J., assignor to Fairchild Camera and Instrument Corporation, a corporation of Delaware Filed Mar. 29, 1965, Ser. No. 443,270
U.S. Cl. 333—29 9 Claims
Int. Cl. H03h 7/30

ABSTRACT OF THE DISCLOSURE

A hybrid distributed-lumped-constant delay line for connection to a balanced electrical circuit having an electrical neutral comprises a plurality of single-layer, coaxial, longitudinally extending delay-line sections. Each of the delay-line sections includes two interlaced coaxial substantially helical insulated windings adapted to be connected in paraphase, the windings having substantially identical dimensions and substantially identical electrical constants relative to the electrical neutral of the line. The two widings have equal and opposite helix angles. A plurality of multilayer windings are individually interposed between and serially connected between adjacent pairs of the delay-line sections. Alternatively, a plurality of capacitance elements are individually interposed between and electrically connected to adjacent pairs of the delay-line sections. A conductive sheath surrounding and insulated from the windings forms an electrical neutral for the delay line.

This invention relates to hybrid distributed-lumped-constant delay lines and, while it is of general application, it is particularly applicable to balanced delay lines of the shielded type which, for a given phase error, provide substantially uniform time delay over a broad range of frequencies.

Heretofore, there have been proposed numerous types of delay lines for translating wave signals with predetermined time delays. These delay lines have been of the lumped-constant type, the distributed-constant type, or a combination of the two. In general, delay lines of the prior art have suffered from two important limitations: (1) undesirably low characteristic impedance for practical physical dimensions and (2) nonuniform time delay or non-linear phase delay over a broad band of frequencies.

The first of the above-noted limitations undesirably limits the gain of any circuit to which the delay line may be connected while the second limitation results in distortion and dispersion of a high-frequency wave signal translated by the line.

It is an object of the invention therefore, to provide a new and improved balanced distributed-lumped-constant delay line which is capable of substantially higher characteristic impedance than prior devices of this type of comparable physical dimensions.

It is another object of the invention to provide a new and improved distributed-lumped-constant delay line which has a substantially uniform time delay over a broad band of frequencies, for example from 0 to 250 mc.

In applicant's copending application Ser. No. 217,651, filed Aug. 17, 1962, now abandoned, there is described and claimed an improved distributed-constant delay line for connection to a balanced electrical circuit having an electrical neutral comprising two interlaced coaxial substantially helical insulated windings adapted to be energized in paraphase, such windings having substantially identical dimensions and substantially identical electrical constants relative to the electrical circuit neutral but having equal and opposite helix angles.

The present invention constitutes a modification of, and improvement upon, the delay line described and claimed in aforesaid copending application and includes provisions for obtaining a phase-frequency response characteristic modified with respect to that of the prior delay line and one that may be readily adjusted by appropriate choice of design parameters.

In accordance with the invention, there is provided a hybrid distributed-lumped-constant delay line for connection to a balanced electrical circuit having an electrical neutral comprising a plurality of coaxial, longitudinally extending delay-line sections, each including two interlaced coaxial substantially helical insulated windings adapted to be energized in paraphase, such windings having substantially identical dimensions and substantially identical electrical constants relative to the electrical neutral of the circuit but having equal and opposite helix angles and each of the winding sections having inherent distributed inductance and capacitance, and a plurality of lumped reactance elements in addition to the distributed inductance and capacitance of the winding sections individually electrically coupled to the junctions of the several sections.

For a better understanding of the present invention, together with other and further objects thereof, reference is had to the following description, taken in connection with the accompanying drawing, while its scope will be pointed out in the appended claims.

Referring now to the drawing:

FIG. 2 is a longitudinal sectional view of the delay line of FIG. 1 with an added conductive sheath forming an electrical neutral, while

Figure 1:
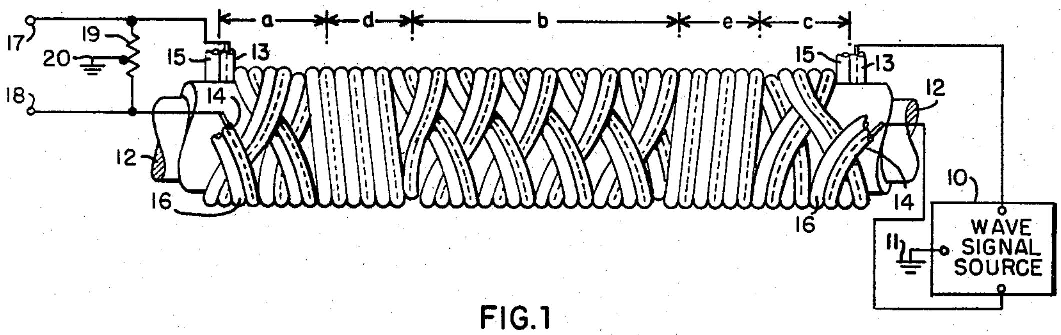
FIG. 1 is a longitudinal view of a hybrid distributed-lumped-constant delay line embodying the invention.
Figure 2:
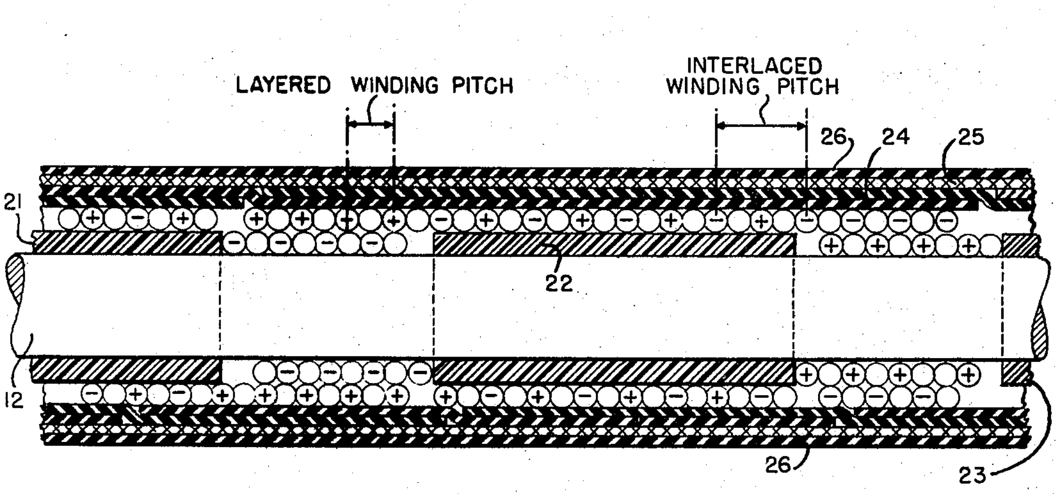

Referring now to FIGS. 1 and 2 of the drawing, there is illustrated a hybrid distributed-lumped-constant delay line embodying the present invention for connection to a balanced electrical circuit such as a wave-signal source 10 having an electrical neutral or ground 11. The delay line includes a central cylindrical core 12 of dielectric material, for example an extruded high-density polyethylene. Alternatively, the core 12 may be of ferromagnetic material which increases the characteristic impedance of the line. On the core 12 are wound two interlaced coaxial substantially helical windings 13 and 14 adapted to be energized in paraphase from the source 10, as illustrated. The windings 13 and 14 may be conventional insulated wire, for example copper wire coated with a polymer of tetrafluoroethylene. The windings 13 and 14 have substantially identical dimensions and substantially identical electrical constants relative to the electrical neutral 11 but, as shown, have equal and opposite helix angles.

The windings 13 and 14 may be close-wound or, alternatively, as illustrated, they may include strands 15 and 16 of insulation material wound in bifilar arrangement with the windings 13 and 14, respectively. The dimensions of the strands 15 and 16 are substantially identical with those of their respective windings 13 and 14. In this way, the pitch of each of the windings 13 and 14 is doubled with respect to a close-wound winding without otherwise changing the design parameters of the delay line. While the windings 13 and 14 with their associated insulation strands 15 and 16 are shown as close-wound, since such arrangement is most conveniently wound in commercial coil-winding machines and an arrangement which is dimensionally most stable, the windings and the associated insulation strands may be wound with any desired pitch.

The ends of the windings 13 and 14 remote from the wave-signal source 10 are connected to output terminals 17 and 18, respectively, to which may be connected a balanced load represented by a resistor 19 having an electrical neutral or ground 20.

The windings 13 and 14, wound as described, are divided into a plurality of sections *a*, *b*, and *c*. The delay line of the invention also includes a plurality of lumped reactance elements, either inductive or capacitive or both, electrically coupled individually to the junctions of the sections *a*, *b*, and *c*. The ends of the winding sections *a*, *b*, and *c* may be contiguous or, as shown, spaced, depending upon the nature of the lumped reactance elements to be coupled to the winding sections.

In the embodiment shown in FIGS. 1 and 2, the sections *a*, *b*, and *c* are shown as being spaced by distances *d* and *e*, respectively, and in the spaces *d* and *e* are disposed, for example, two two-layer close-wound winding sections. Each of the sections *d* and *e* includes a continuation of both of the windings 13 and 14 and the interleaved insulation strands 15 and 16, respectively. However, they are close-wound in two layers in a conventional manner and are interposed between and serially connected between the adjacent pair of sections *a*, *b*, and *c*. However, the layered-winding sections *d* and *e* essentially provide lumped capacitance between the interleaved windings 13, 14 at the section junction points. One of the windings in each of the sections *d* and *e* is connected in series with the winding 13 of sections *a*, *b*, and *c* while the other is connected in series with the winding 14 of the sections *a*, *b*, and *c*. In the section *d*, the inner winding layer, identified for convenience by a minus (−), is connected in series with the winding 13 while the outer winding layer, identified by a plus (+), is connected in series with the winding 14. In alternate sections, for example in section *e*, the winding layers are inverted. This is shown more clearly in FIG. 2. In that figure, it will be noted that annular plastic spacers 21, 22, and 23 are disposed on the core 12 and the winding sections *a*, *b*, and *c* wound thereon so that the single-layer winding sections *a*, *b*, and *c* have the same outer diameter as the layered-winding sections *d* and *e*. It will also be noted that the section *b*, and any other sections of the line other than the terminal sections *a* and *c*, is of a length different from the layered-winding sections *d* and *e*. The ratio of the length of each of the distributed winding sections to that of the layered-winding sections depends upon the amount of substantially linear phase correction desired. While the delay line shown in FIGS. 1 and 2 includes, by way of example, only the three distributed-constant sections *a*, *b*, and *c*, it is apparent that, in practice, the delay line will be made continuous and cut into desired lengths, the pattern of FIGS. 1 and 2 repeating indefinitely.

As shown in FIG. 2, the delay line thus described is then enclosed in a sheath 24 of insulation material, a conductive braid 25 forming an electrical neutral for the delay line, and an outer protective coating 26.

The design parameters of the delay line of FIGS. 1 and 2 embodying the invention may be proportioned in accordance with the teaching of applicant's aforesaid copending application Ser. No. 217,651. It may be designed to provide wide ranges of characteristic impedances $Z_0$, delay per unit length, phase error, and attenuation. The provision of the lumped or concentrated reactance sections *d* and *e* at the junctions of the delay-line sections *a*, *b*, and *c* modifies the phase-frequency response characteristic of the line as a whole and provides a design parameter for controlling this characteristic over a broad range. If the lumped constants of the sections *d* and *e* are small relative to those of the sections *a*, *b*, and *c*, the over-all line will retain substantially the inherent phase characteristics of a pure distributed line, as described in aforesaid copending application. If the sheath 24 is brought into closer proximity to the windings to increase the phase compensation, this will have the effect of reducing the characteristic impedance and reducing the incremental delay. Conversely, if the latter characteristic is a limitation for the particular application, a greater degree of lumpiness can be provided and the proximity of the conductive shield 25 reduced, thereby increasing the characteristic impedance and the incremental delay of the line. Thus, the provision of the layered-winding sections of the line provides an additional degree of control of the characteristics of the delay line without substantially impairing the linear phase characteristics of a perfectly distributed delay line.

Figure 3:
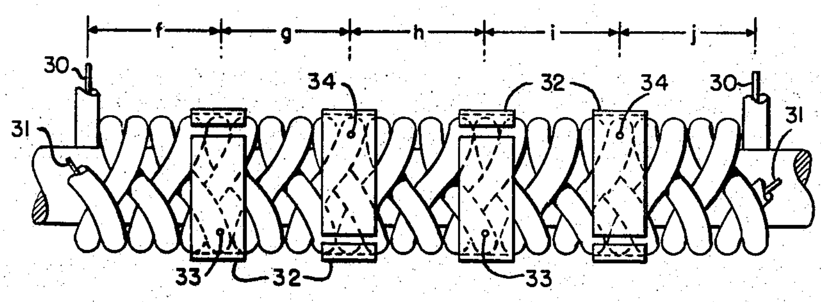
FIG. 3 is a longitudinal view of a modified form of hybrid distributed-lumped-constant delay line.

Referring now to FIG. 3, there is shown a modified form of the invention comprising a pair of windings 30, 31, wound in the same fashion as the sections *a*, *b*, and *c* of windings 13 and 14 of FIGS. 1 and 2, except that they are close-wound without the interposition of insulation strands. For clarity, the sheaths 24, 25, and 26 have been omitted. This line may be considered as comprising a series of equal axial sections *f*, *g*, *h*, *i*, and *j* which, in this event, are contiguous. The delay line includes a plurality of capacitive sleeves in the form of split conductive rings 32, 32, etc. insulated from the windings 30 and 31 and surrounding the line at the junctions of the several sections. Alternate capacitive sleeves 32 are electrically connected to one of the windings, for example the winding 31, as indicated by the connection dots 33, 33 while the intermediate capacitive sleeves are connected to the other winding 30 at the intermediate section junctions, as indicated by the connection dots 34, 34.

In the FIG. 3 embodiment of the invention, the capacitive sleeves 32, 32, etc. comprise lumped capacitive reactance elements only, which may be electrically connected to serve as a capacitance in a circuit or system, such as in a balanced distributed parametric amplifier of the type described and claimed in Gerr Patent No. 3,155,916, issued Nov. 3, 1964. In such an application, the tap connections to the interleaved windings should be made at points of equal delay in order to maintain symmetry in the balanced amplifier.

The arrangement of FIG. 3 may be somewhat modified by eliminating the electrical connections 33 and 34 and making the radial thickness of the capacitive sleeves 32, 32, etc. a substantial portion of the distance between the delay-line conductors 30 and 31 and the conductive shield 25, thus establishing substantial lumped capacitance at each of the sleeves.

While there have been described what are, at present, considered to be the preferred embodiments of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. A hybrid distributed-lumped-constant delay line for connection to a balanced electrical circuit having an electrical neutral comprising:

a plurality of coaxial, longitudinally extending delay-line sections, each including two interlaced coaxial substantially helical insulated windings adapted to be energized in paraphase, said windings having substantially identical dimensions, having substantially identical electrical constants relative to said electrical neutral, but having equal and opposite helix angles and each of said winding sections having inherent distributed inductance and capacitance;

and a plurality of lumped reactance elements in addition to said distributed inductance and capacitance of said winding sections individually electrically coupled to the junctions of said sections.

2. A hybrid distributed-lumped-constant delay line for connection to a balanced electrical circuit having an electrical neutral comprising:

a plurality of coaxial, longitudinally extending delay-line sections, each including two interlaced coaxial substantially helical insulated windings adapted to be energized in paraphase, said windings having substantially identical dimensions, having substantialy identical electrical constants relative to said electrical neutral, but having equal and opposite helix angles;

a first plurality of lumped reactance elements individually electrically coupled to alternate junctions of one of said windings;

and a second plurality of substantially identical lumped reactance elements individually electrically coupled to the intermediate junctions of the other of said windings.

3. A hybrid distributed-lumped-constant delay line for connection to a balanced electrical circuit having an electrical neutral comprising:

a plurality of coaxial, longitudinally extending delay-line sections, each including two interlaced coaxial substantially helical insulated windings adapted to be energized in paraphase, said windings having substantially identical dimensions, having substantially identical electrical constants relative to said electrical neutral, but having equal and opposite helix angles and each of said winding sections having inherent distributed inductance and capacitance;

and a plurality of elements providing lumped capacitance in addition to said distributed capacitance of said winding sections individually interposed between and electrically connected to adjacent pairs of said sections.

4. A hybrid distributed-lumped-constant delay line for connection to a balanced electrical circuit having an electrical neutral comprising:

a plurality of coaxial, longitudinally extending delay-line sections, each including two interlaced coaxial substantially helical insulated windings adapted to be energized in paraphase, said windings having substantially identical dimensions, having substantially identical electrical constants relative to said electrical neutral, but having equal and opposite helix angles and each of said winding sections having inherent distributed inductance and capacitance;

and a plurality of lumped reactance elements in addition to said distributed inductance and capacitance of said winding sections and in the form of multilayer windings individually interposed between and serially connected between adjacent pairs of said sections.

5. A hybrid distributed-lumped-constant delay line for connection to a balanced electrical circuit having an electrical neutral comprising:

a plurality of coaxial, longitudinally extending single-layer delay-line sections, each including two interlaced coaxial substantially helical insulated windings adapted to be energized in paraphase, said windings having substantially identical dimensions, having substantially identical electrical constants relative to said electrical neutral, but having equal and opposite helix angles and each of said winding sections having inherent distributed inductance and capacitance;

a plurality of lumped reactance elements in addition to said distributed inductance and capacitance of said winding sections and in the form of multilayer windings individually interposed between and serially connected between adjacent pairs of said sections and having the same outer diameter as said delay-line sections;

and a conductive sheath surrounding and insulated from said windings and forming an electrical neutral therefor.

6. A hybrid distributed-lumped-constant delay line for connection to a balanced electrical circuit having an electrical neutral comprising:

a plurality of coaxial, longitudinally extending single-layer delay-line sections, each including two interlaced coaxial substantially helical insulated windings adapted to be energized in paraphase, said windings having substantially identical dimensions, having substantially identical electrical constants relative to said electrical neutral, but having equal and opposite helix angles;

a pair of strands of insulation material, each of dimensions substantially identical to one of said windings and each wound in bifilar arrangement with one of said windings;

and a plurality of two-layer close-wound windings individually interposed between and serially connected between adjacent pairs of said sections.

7. A hybrid distributed-lumped-constant delay line for connection to a balanced electrical circuit having an electrical neutral comprising:

a plurality of coaxial, longitudinally extending delay-line sections, each including two interlaced coaxial substantially helical insulated windings adapted to be energized in paraphase, said windings having substantially identical dimensions, having substantially identical electrical constants relative to said electrical neutral, but having equal and opposite helix angles;

and a plurality of capacitive sleeves individually surrounding said line at each of the junctions of said sections and electrically insulated therefrom except for a conductive connection to one of said windings at said junction.

8. A hybrid distributed-lumped-constant delay line for connection to a balanced electrical circuit having an electrical neutral comprising:

a plurality of coaxial, longitudinally extending delay-line sections, each including two interlaced coaxial substantially helical insulated windings adapted to be energized in paraphase, said windings having substantially identical dimensions, having substantially identical electrical constants relative to said electrical neutral, but having equal and opposite helix angles;

and a plurality of capacitive sleeves individually surrounding said line at each of the junctions of said sections and electrically insulated therefrom except for conductive connections alternately to one and the other of said two windings.

9. A hybrid distributed-lumped-constant delay line for connection to a balanced electrical circuit having an electrical neutral comprising:

a plurality of coaxial, longitudinally extending delay-line sections, each including two interlaced coaxial substantially helical insulated windings adapted to be energized in paraphase, said windings, having substantially identical dimensions, having substantially identical electrical constants relative to said electrical neutral, but having equal and opposite helix angles;

and a plurality of capacitive sleeves individually surrounding said line at each of the junctions of said sections and coupled to said windings at said junction, said sleeves at said junctions being connected alternately to one of the other of said two windings.

References Cited

UNITED STATES PATENTS

| | | | |
|---|---|---|---|
| 2,178,653 | 11/1939 | Slade | 333—29 X |
| 2,457,212 | 12/1948 | Di Toro | 333—31 |
| 2,871,453 | 1/1959 | Bradley | 333—31 X |
| 2,898,558 | 8/1959 | Oberbeck | 333—31 X |

HERMAN KARL SAALBACH, *Primary Examiner.*

P. L. GENSLER, *Assistant Examiner.*

U.S. Cl. X.R.

333—31